United States Patent
Kim (10) Patent No.: US 6,847,250 B2
(45) Date of Patent: Jan. 25, 2005

(54) PUMPING CIRCUIT FOR OUTPUTTING PROGRAM VOLTAGE AND PROGRAM VERIFY VOLTAGE OF DIFFERENT LEVELS

(75) Inventor: Young Joo Kim, Busan-Shi (KR)

(73) Assignee: Hynix Semiconductor Inc., Ichon-Shi (KR)

( * ) Notice: Subject to any disclaimer, the term of this patent is extended or adjusted under 35 U.S.C. 154(b) by 0 days.

(21) Appl. No.: 10/311,000

(22) Filed: Dec. 6, 2002

(65) Prior Publication Data

US 2004/0000945 A1 Jan. 1, 2004

(30) Foreign Application Priority Data

Jun. 29, 2002 (KR) .................................. 10-2002-0037321

(51) Int. Cl.[7] .............................................. G05F 3/02
(52) U.S. Cl. ........................ 327/536; 327/537; 363/59
(58) Field of Search .............................. 327/534, 536, 327/537; 363/59

(56) References Cited

U.S. PATENT DOCUMENTS

| | | | | |
|---|---|---|---|---|
| 5,602,794 A | * | 2/1997 | Javanifard et al. | 365/226 |
| 5,767,735 A | * | 6/1998 | Javanifard et al. | 327/536 |
| 5,999,040 A | * | 12/1999 | Do et al. | 327/536 |
| 6,369,642 B1 | * | 4/2002 | Zeng | 327/536 |

* cited by examiner

*Primary Examiner*—Terry D. Cunningham
(74) *Attorney, Agent, or Firm*—Piper Rudnick LLP (57) ABSTRACT

The present invention relates to a pumping circuit. The pumping circuit comprises a first pumping block for pumping an input voltage, a first latch for latching the output of the first pumping block, a second pumping block for pumping the output of the first pumping block according to a control signal, a second latch for latching the output of the second pumping block, and a switching circuit for selectively outputting the outputs of the first and second latches according to the control signal. Thus, a program voltage and a program verify voltage of different levels are pumped. The ripple and active current can be reduced and the program efficiency can be increased.

11 Claims, 6 Drawing Sheets

PUMPING CIRCUIT FOR OUTPUTTING PROGRAM VOLTAGE AND PROGRAM VERIFY VOLTAGE OF DIFFERENT LEVELS

BACKGROUND OF THE INVENTION

1. Field of the Invention

The invention relates generally to a pumping circuit, and more particularly to, a pumping circuit wherein a program voltage and a program verify voltage of different levels are pumped using a program verify signal, thus reducing ripples and active current.

2. Description of the Prior Art

In the flash memory device, program, erase and read operations are performed according to the voltage applied to the word line of a selected cell, drain/source, and the substrate. In order to perform the program operation of the flash memory cell, it is required that a pumping voltage of about 9V higher a little than the power supply voltage be generated using a pumping circuit and a regulation circuit and the generated voltage be then applied to the word line of the selected cell. 다.

Figure 1A:
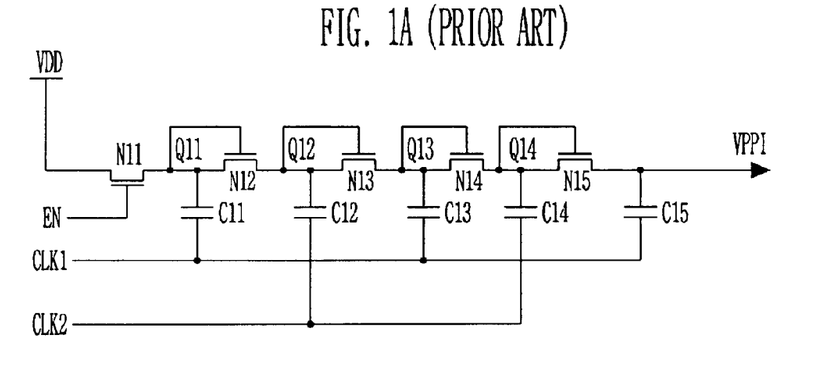
FIG. 1A and FIG. 1B illustrate a common pumping circuit and an operating waveform of the pumping circuit, respectively.

FIG. 1A shows a common pumping circuit that is used to program the flash memory cell. The construction of the pumping circuit in FIG. 1A will be below described.

A first NMOS transistor N11 driven by an enable signal (EN) is connected between the power supply terminal VDD and a first node Q11. A second NMOS transistor N12 is diode-connected between the first node Q11 and a second node Q12. A third NMOS transistor N13 is diode-connected between the second node Q12 and a third node Q13. A fourth NMOS transistor N14 is diode-connected between the third node Q13 and a fourth node Q14. A fifth NMOS transistor N15 is diode-connected between the fourth node Q14 and an output terminal VPPI. Further, the first~fifth capacitors C11~C15 that are charged according to first and second clock signals (CLK1 and CLK2) are connected to the nodes Q11~Q14 and the output terminal VPPI, respectively. In other words, the first, third and fifth capacitors C11, C13 and C15 that are charged according to the first clock signal (CLK1) are connected to the first node Q11, the third node Q13 and output terminal VPPI, respectively. Also, the second and fourth capacitors C12 and C14 that are charged according to the second clock signal (CLK2) are connected to the second and fourth nodes Q12 and Q14, respectively.

Figure 1B:
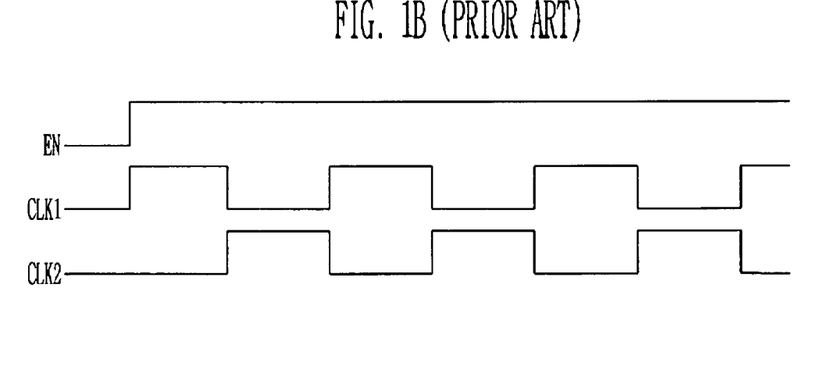

A method of driving the pumping circuit constructed above will be described by reference to the operating waveform shown in FIG. 1B.

If the enable signal (EN) is applied as a HIGH state, the first NMOS transistor N11 is turned on. Thus, the power supply voltage (VDD) is applied and the first~fifth capacitors C11~C15 are charged according to the first and second clock signals (CLK1 and CLK2) having opposite phases, respectively, so that the voltage of the respective node is raised. In other words, the first, third and fifth capacitors C11, C13 and C15 are charged according to the first clock signal (CLK1), so that the first and third nodes Q11 and Q13 and the output terminal VPPI are raised to a given voltage. Further, the second and fourth capacitors C12 and C14 are also charged according to the second clock signal (CLK2), so that the second and fourth nodes Q12 and Q14 are raised to a given voltage. The voltage of the node raised such is transferred to a next stage through the second~fifth NMOS transistors N12~N15 that are diode-connected. Finally, the output terminal VPPI keeps a given voltage, which is determined by the power supply voltage (VDD) and the number and capacity of the capacitor.

However, in order to program the flash memory cell, the program verify operation is performed to very whether the selected cell is programmed. The program operation is again performed depending on the result of the verification. The program and program verify operations are repeatedly performed by a set times. At this time, in order to perform the program verify operation, it is required to apply the program verify voltage of about 6V to the word line of the cell. The program verify voltage is one generated by a regulation circuit that changes a regulation level of the pumping voltage of about 9V generated in the pumping circuit. Therefore, as the pumping voltage must be regulated as the program verify level using the pumping circuit for generating the program voltage, many ripples may occur and the active current is also increased.

Figure 2:
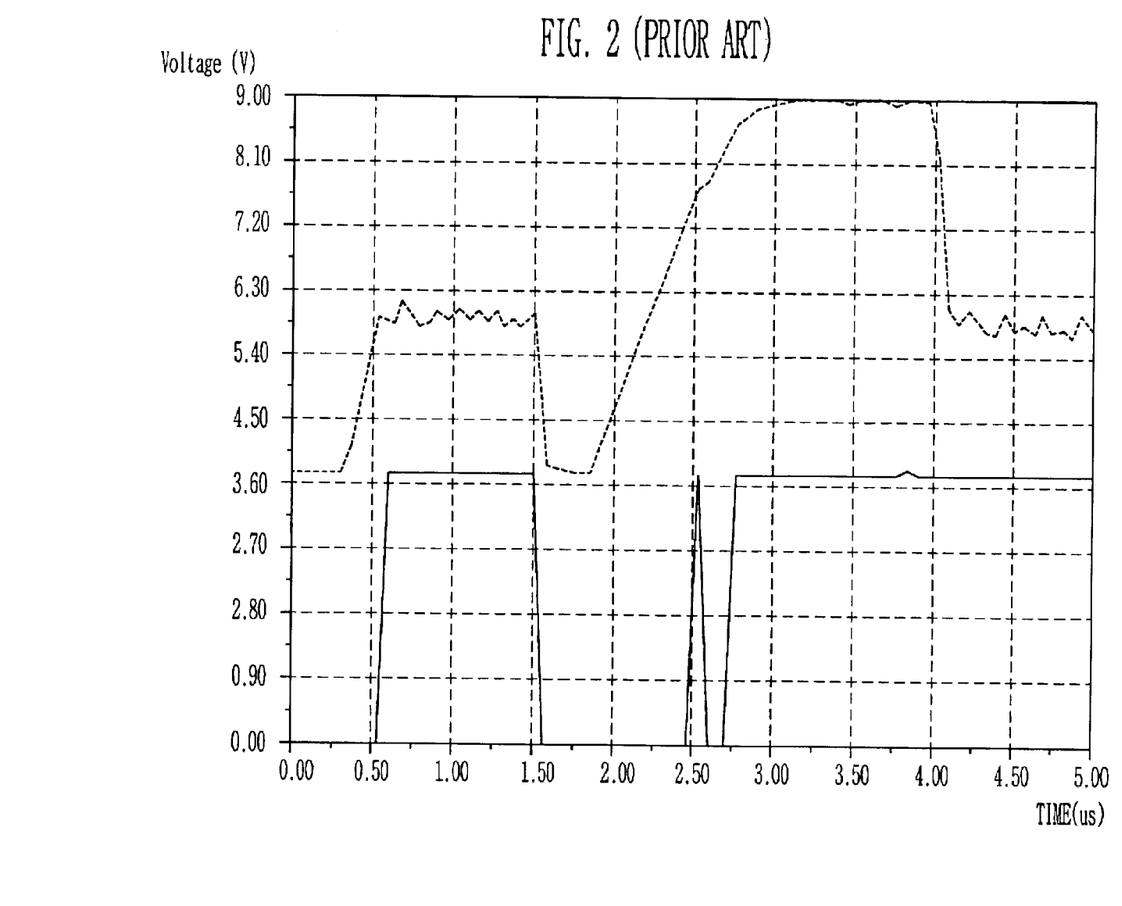
FIG. 2 is a graph illustrating a ripple generated when a regulated pumping voltage of the common pumping circuit regulated is used for the program verify operation.

FIG. 2 is a graph illustrating the ripples generating when the program verify voltage is regulated using the pumping circuit for generating the program voltage. The ripples in this program verify operation may give rise to confusion in determining whether the program operation of the cell is successful or failed. If the worst, an erroneous operation determining that the failed cell is successful as a result of the program verify operation may be generated.

SUMMARY OF THE INVENTION

The present invention is contrived to solve the above problems and an object of the present invention is to provide a pumping circuit capable of reducing ripple and active currents in such a way that the number of a pumping stage and a capacitor are differentiated to generate different pumping voltages in program and program verify operations.

Another object of the present invention is to provide a pumping circuit capable of reducing the ripple and active current by generating a program voltage and a program verify voltage using a program verify signal.

In order to accomplish the above object, the pumping circuit according to the present invention is characterized in that it comprises a first pumping block for pumping an input voltage, a first latch for latching a first output of the first pumping block, a second pumping block for pumping the first output of the first pumping block, a second latch for latching a second output of the second pumping block; and a switching circuit for selectively outputting the outputs of the first and second latches according to the control signal.

Further, the pumping circuit of the present invention is characterized in that it comprises a first pumping block including a plurality of diodes which are connected in series from each other through the respective connection node and a plurality of capacitors connected to the respective connection node between the diodes, respectively, wherein the plurality of the capacitors are charged according to a plurality of clock signals having opposite phases and pump an input voltage to generate a program verify voltage, a first latch for latching the program verify voltage from the first pumping block, a second pumping block including a plurality of diodes which are connected in series from each other through the respective connection node and a plurality of capacitors connected to the respective connection node between the diodes, respectively, wherein the plurality of the capacitors are charged according to a plurality of clock signals having opposite phases that are generated by an inverted signal of a program verify signal and pump the output of the first pumping block to generate a program voltage, a second latch for latching the program voltage from the second pumping block, and a switching circuit for selectively outputting the outputs of the first and second latches according to the inverted signal of the program verify signal.

Meanwhile, the pumping circuit according to the present invention is characterized in that it comprises first and second clock generators for generating first and second clock signals having opposite phases, a third clock generator for logically combining the first clock signal and an inverted signal of a program verify signal to generate a third clock signal, a fourth clock generator for logically combining the second clock signal and the inverted signal of the program verify signal to generate a fourth clock signal, a plurality of diodes connected between respective nodes between an input node and an output node, for transferring the voltage of a previous node to a next node, a plurality of capacitors connected between the plurality of the diodes which are connected in series from each other through the respective connection node, respectively, and charged according to the first through fourth clock signals to raise the voltage of each of the nodes, a first latch for latching the voltage of a given node, wherein the node keeps a voltage that is raised to a program verify voltage by the capacitor charged according to the first and second clock signals, a second latch for latching the voltage of the output node, wherein that output node keeps a voltage that is raised to a program voltage by the capacitor charged according to the first through fourth clock signals, and a switching circuit for selectively outputting the voltages latched in the first and second latches according to an inverted signal of the program verify signal.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF PREFERRED EMBODIMENTS

The present invention will be described in detail by way of a preferred embodiment with reference to accompanying drawings, in which like reference numerals are used to identify the same or similar parts.

Figure 3:
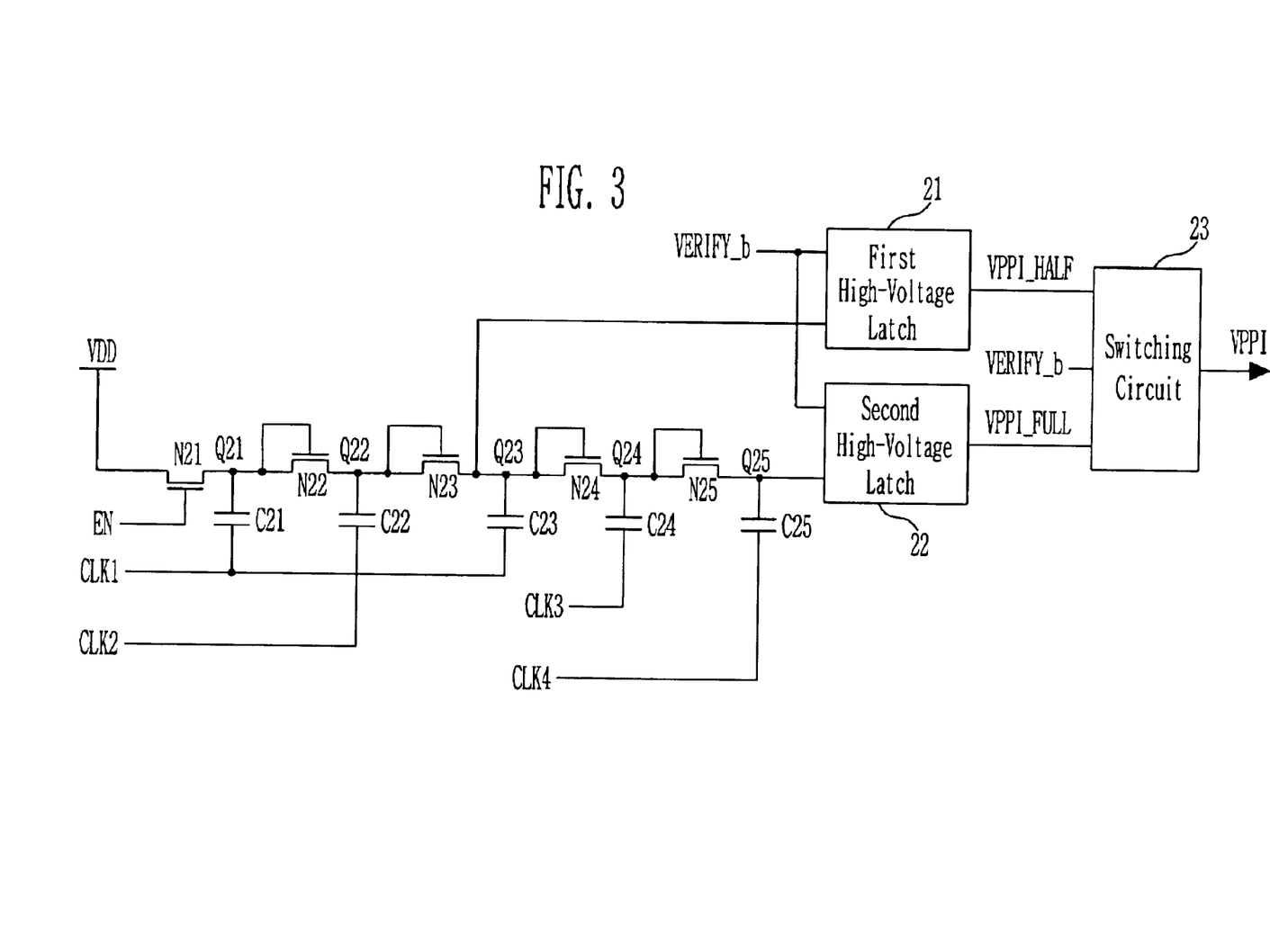
FIG. 3 shows a pumping circuit according to a preferred embodiment of the present invention.

FIG. 3 shows a pumping circuit according to a preferred embodiment of the present invention. The construction of the pumping circuit according to the present invention will be below described by reference to FIG. 3.

Figure 4A:
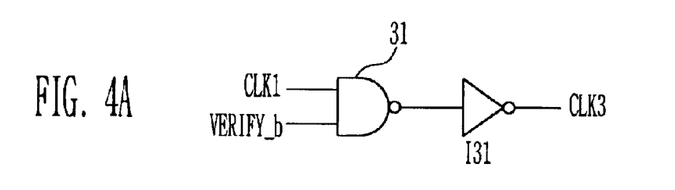
FIG. 4A and FIG. 4B show clock generators for generating third and fourth clock signals in the pumping circuit according to the present invention.
Figure 4B:
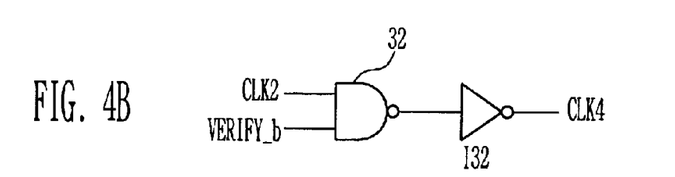

A first NMOS transistor N21 driven by an enable signal (EN) is connected between the power supply terminal VDD and a first node Q21. A second NMOS transistor N12 is diode-connected between the first node Q21 and a second node Q22. A third NMOS transistor N23 is diode-connected between the second node Q22 and a third node Q23. A fourth NMOS transistor N24 is diode-connected between the third node Q23 and a fourth node Q24. A fifth NMOS transistor N25 is diode-connected between the fourth node Q24 and a fifth node Q25. Also, first and third capacitors C21 and C23 charged according to a first clock signal (CLK1) from the first clock generator are connected to the first node Q21 and the third node Q23, respectively. A second capacitor C22 charged according to a second clock signal (CLK2) from a second clock generator is connected to the second node Q22. Further, a fourth capacitor C24 charged according to a third clock signal (CLK3) from a third clock generator is connected to the fourth node Q24, as shown in FIG. 4A. A fifth capacitor C25 charged according to by a fourth clock signal (CLK4) from a fourth clock generator is connected to the fifth node Q25, as shown in FIG. 4B.

At this time, the third clock generator comprises a first NAND gate 31 for logically combining the first clock signal (CLK1) and a verify bar signal (VERIFY_b) being an inverted signal of a verify signal, and a first inverter I31 for inverting the output of the first NAND gate 31, as shown in FIG. 4A. Also, the fourth clock generator comprises a second NAND gate 32 for logically combining the second clock signal (CLK2) and the verify bar signal (VERIFY_b) being the inverted signal of the verify signal, and a second inverter I32 for inverting the output of the second NAND gate 32, as shown in FIG. 4B. When the verify bar signal (VERIFY_b) is applied as a LOW state, the voltage of the third node Q23 is latched in a first high-voltage latch 21, depending on the program verify operation, and is then outputted through a switching circuit 23. Also, when the verify bar signal (VERIFY_b) is applied as a HIGH state, the voltage of the fifth node Q25 is latched in a second high-voltage latch 22, depending on the program operation, and is then outputted through a switching circuit 23.

Figure 5:
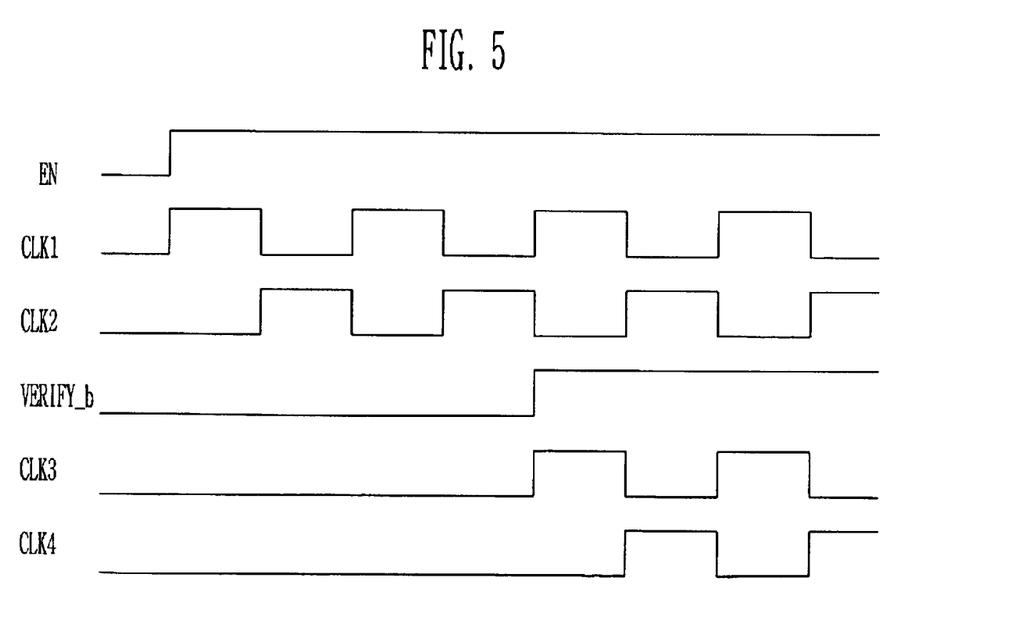
FIG. 5 illustrates an operating waveform of the pumping circuit according to the present invention.

A method of driving the pumping circuit constructed above will be below described by reference to an operating waveform shown in FIG. 5.

First, an operation in a case where the program verify voltage is pumped when the enable signal (EN) is applied as the HIGH state and the verify bar signal (VERIFY_b) is applied as the LOW state will be described.

If the enable signal (EN) is applied as the HIGH state, the first NMOS transistor N21 is turned and the power supply voltage (VDD) is thus supplied. Also, the first~third capacitors C21~C23 are charged according to the first and second clock signals (CLK1 and CLK2) having opposite phases, respectively, so that the voltages of the first~third nodes Q21~Q23 are raised.

Meanwhile, as the verify bar signal (VERIFY_b) is applied as the LOW state, the third clock signal (CLK3) and the fourth clock signal (CLK4) are applied as the LOW state, by the NAND gates 31 and 32 for logically combining the verify bar signal (VERIFY_b) and the first and second clock signals (CLK1 and CLK2) and the inverters I31 and I32 for inverting the verify bar signal (VERIFY_b) and the first and second clock signals (CLK1 and CLK2), as shown in FIG. 4A and FIG. 4B. Therefore, the fourth and fifth capacitors C24 and C25 are not charged and do not change the voltages of the fourth and fifth nodes Q24 and Q25. The voltage of the node that is raised to a given level by the first~third capacitors C21~C23 is transferred to a next node through the second and third NMOS transistors N22 and N23 that are diode-connected. The voltage of the third node Q23 is latched in the first high-voltage latch 21.

Next, an operation in a case where the program voltage is pumped when the enable signal (EN) is applied as the IGH state and the verify bar signal (VERIFY_b) is applied as the HIGH state will be described.

If the enable signal (EN) is applied as the HIGH state, the first NMOS transistor N21 is turned on and the power supply voltage (VDD) is thus supplied. Also, the first~third capacitors C21~C23 are charged according to the first and second clock signals (CLK1 and CLK2) having opposite phases, respectively, so that the voltages of the first~third nodes Q21~Q23 are raised. Further, as the verify bar signal (VERIFY_b) is applied as the HIGH state, the third clock signal (CLK3) is inputted with the same phase as the first clock signal (CLK1) and the fourth clock signal (CLK4) is inputted with the same phase as the second clock signal (CLK2), by the NAND gates 31 and 32 and the inverters I31 and I32 as shown in FIG. 4A and FIG. 4B, so that the fourth and fifth capacitor C24 and C25 are charged according to the third clock signal (CLK3) and the fourth clock signal (CLK4), respectively. Thereby, the fourth and fifth nodes Q24 and Q25 are raised to a given voltage. The voltages of the nodes raised thus are transferred to a next node through the second~fifth NMOS transistors N22~N25 that are diode-connected and are also latched in the second high-voltage latch 22.

The first pumping voltage (VPPI_HALF) for the program verify operation, which is latched in the first high-voltage latch 21, and the second pumping voltage (VPPI_FULL) for the program operation, which is latched in the second high-voltage latch 22, are switched by the switching circuit 23 driven by the verify bar signal (VERIFY_b) and then outputted to the output terminal (VPPI).

Figure 6:
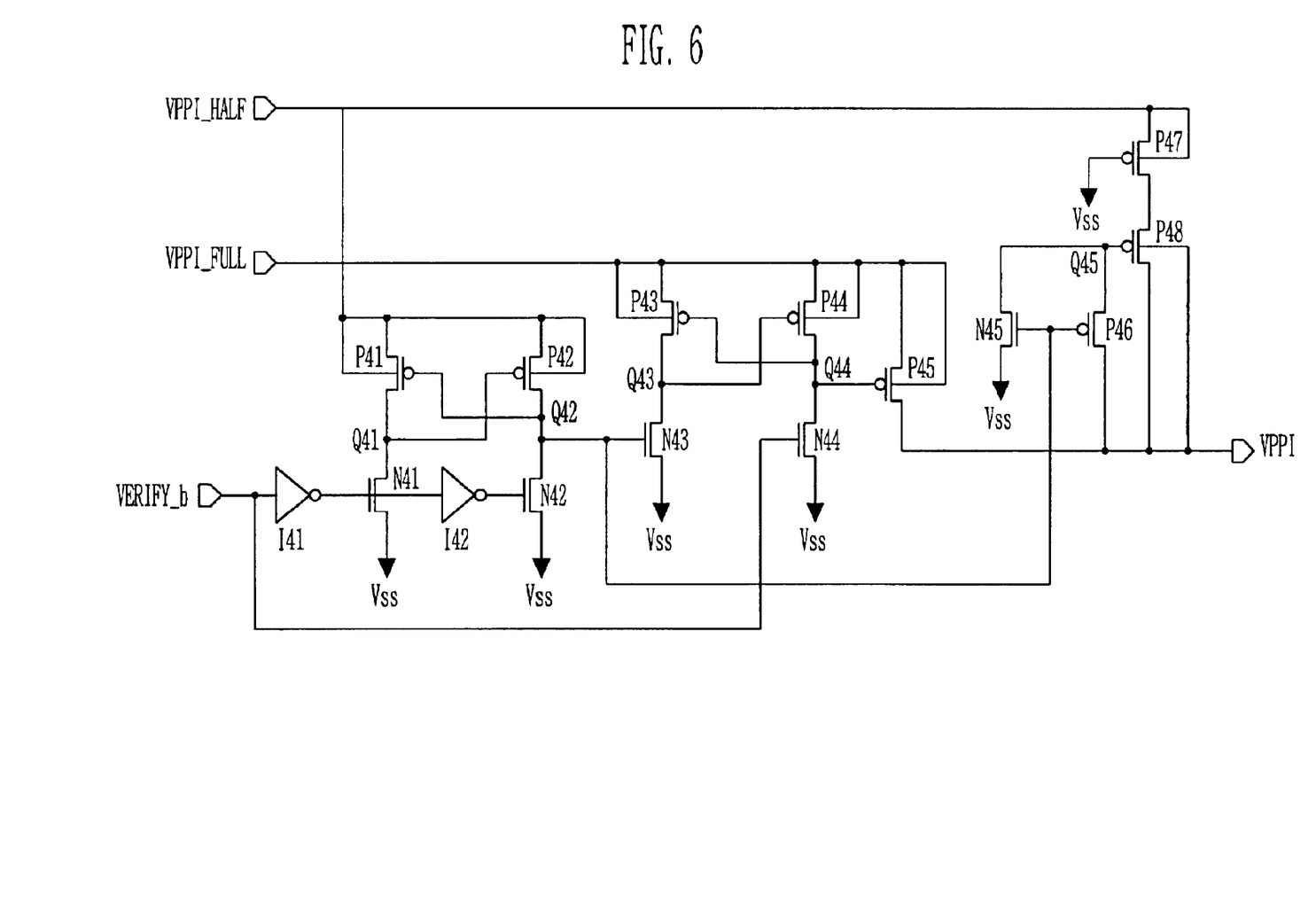
FIG. 6 shows the switching circuit with latches in the pumping circuit according to the present invention.

Referring now to FIG. 6, a construction of a switching circuit constituting the pumping circuit according to the present invention will be described.

A first PMOS transistor P41 driven by the voltage of a second node Q42 is connected between the output terminal of the first pumping voltage (VPPI_HALF) for the program verify operation and a first node Q41. A first NMOS transistor N41 driven by a signal being a result of the verify bar signal (VERIFY_b) that is inverted through the first inverter I41, is connected between the first node Q41 and the ground terminal (Vss). A second PMOS transistor P42 driven by the voltage of the first node Q41 is connected between the output terminal of the first pumping voltage (VPPI_HALF) for the program verify operation and the second node Q42. A second NMOS transistor N42 driven by a signal being a result of the verify bar signal (VERIFY_b) that is delayed through the first and second inverters I41 and I42, is connected between the second node Q42 and the ground terminal (Vss). The first PMOS transistor P41, the first NMOS transistor N41, the second PMOS transistor P42 and the second NMOS transistor N42 form the first high-voltage latch 21. A third PMOS transistor P43 driven by a fourth node Q44 is connected between the output terminal of the second pumping voltage (VPPI_FULL) for the program operation and a third node Q43. A third NMOS transistor N43 driven by the voltage of the second node Q42 is connected between the third node Q43 and the ground terminal (Vss). A fourth PMOS transistor P44 driven by the voltage of the third node Q43 is connected between the output terminal of the second pumping voltage (VPPI_FULL) for the program operation and the fourth node Q44. A fourth NMOS transistor N44 driven by the verify bar signal (VERIFY_b) is connected between the fourth node Q44 and the ground terminal (Vss). A fifth PMOS transistor P45 driven by the voltage of the fourth node Q44 is connected between the output terminal of the second pumping voltage (VPPI_FULL) for the program operation and the output terminal (VPPI). The third PMOS transistor P43, the third NMOS transistor N43, the fourth PMOS transistor P44 and the fourth NMOS transistor N44 form the second high-voltage latch 22. A fifth NMOS transistor N45 driven by the second node Q42 is connected between the fifth node Q45 and the ground terminal (Vss). A sixth PMOS transistor P46 driven by the voltage of the second node Q42 is connected between the fifth node Q45 and the output terminal VPPI. A seventh PMOS transistor P47 having a gate connected to the ground terminal (Vss), for maintaining a turn-on state, and an eighth PMOS transistor P48 driven by the voltage of the fifth node Q45, are serially connected between the output terminal of the first pumping voltage (VPPI_HALF) for the program very operation and the output terminal VPPI.

A method of driving the switching circuit constructed above will be now described.

In order to perform the program verify operation, if the verify bar signal (VERIFY_b) is applied as a LOW state, the fourth NMOS transistor N44 is turned off. The signal is then inverted to a HIGH state through the first inverter I41 to turn on the first NMOS transistor N41. Next, the signal is again inverted to the LOW state through the second inverter I42 to turn off the second NMOS transistor N42. As the first NMOS transistor N41 is turned on, the first node Q41 keeps the LOW state. The second PMOS transistor P42 is turned on by the voltage of the first node Q41 that keeps the LOW state, so that the first pumping voltage (VPPI_HALF) for the program verify operation is supplied to the second node Q42. Thus, the second node Q42 keeps the HIGH state, which then turns off the first PMOS transistor P41. As the third NMOS transistor N43 is turned on by the voltage of the second node Q42 that keeps the HIGH state, the third node Q43 keeps the LOW state. As the fourth PMOS transistor P44 is turned on by the voltage of the third node Q43 that keeps the LOW state, the second pumping voltage (VPPI_FULL) for the program operation is supplied to the fourth node Q44. Thus, the fourth node Q44 keeps the HIGH state, and the third and fifth PMOS transistors P43 and P45 are turned off by this voltage. As the fifth PMOS transistor P45 is turned off, the second pumping voltage (VPPI_FULL) for the program operation is not outputted to the output terminal (VPPI). Meanwhile, the fifth NMOS transistor N45 is turned on and the sixth PMOS transistor P46 is turned off, by the voltage of the second node Q42 that keeps the HIGH state. Thus, the fifth node Q45 keeps the LOW state and the eighth PMOS transistor P48 is turned on by this voltage. Accordingly, the first pumping voltage (VPPI_HALF) for the program verify operation is outputted to the output terminal (VPPI) through the seventh PMOS transistor (P47) and the eighth PMOS transistor (P48), both of which are turned on.

In order to perform the program operation, if the verify bar signal (VERIFY_b) is applied as the HIGH state, the fourth NMOS transistor N44 is turned on. The signal is then inverted to the LOW state through the first inverter I41 to turn off the first NMOS transistor N41. Next, the signal is again inverted to the HIGH state through the second inverter I42 to turn on the second NMOS transistor N42. As the second NMOS transistor N42 is turned on, the second node Q42 keeps the LOW state. The first PMOS transistor P41 is turned on by the voltage of the second node Q42 that keeps the LOW state, so that the first pumping voltage (VPPI_HALF) for the program verify operation is supplied to the first node Q41. Thus, the first node Q41 keeps the HIGH state and the second PMOS transistor P42 is turned off by the voltage. Also, the third and fifth NMOS transistors N43 and N45 are turned off and the sixth PMOS transistor P46 is turned on, by the voltage of the second node Q42 that keeps the LOW state. Thus, the fifth node Q45 keeps the voltage of the output terminal (VPPI). Thereby, as the eighth PMOS transistor P48 is turned off, the first pumping voltage (VPPI_HALF) for the program verify operation is not outputted to the output terminal (VPPI). Meanwhile, the fourth NMOS transistor N44 is turned on the verify bar signal (VERIFY_b) applied to the HIGH state. Thus, the fourth node Q44 keeps the LOW state. Also, the third and fifth PMOS transistors P43 and P45 are turned on by the voltage of the fourth node Q44 that keeps the LOW state. Thus, the second pumping voltage (VPPI_FULL) for the program operation is outputted to the output terminal (VPPI) through the fifth PMOS transistor P45 that is turned on.

Figure 7:
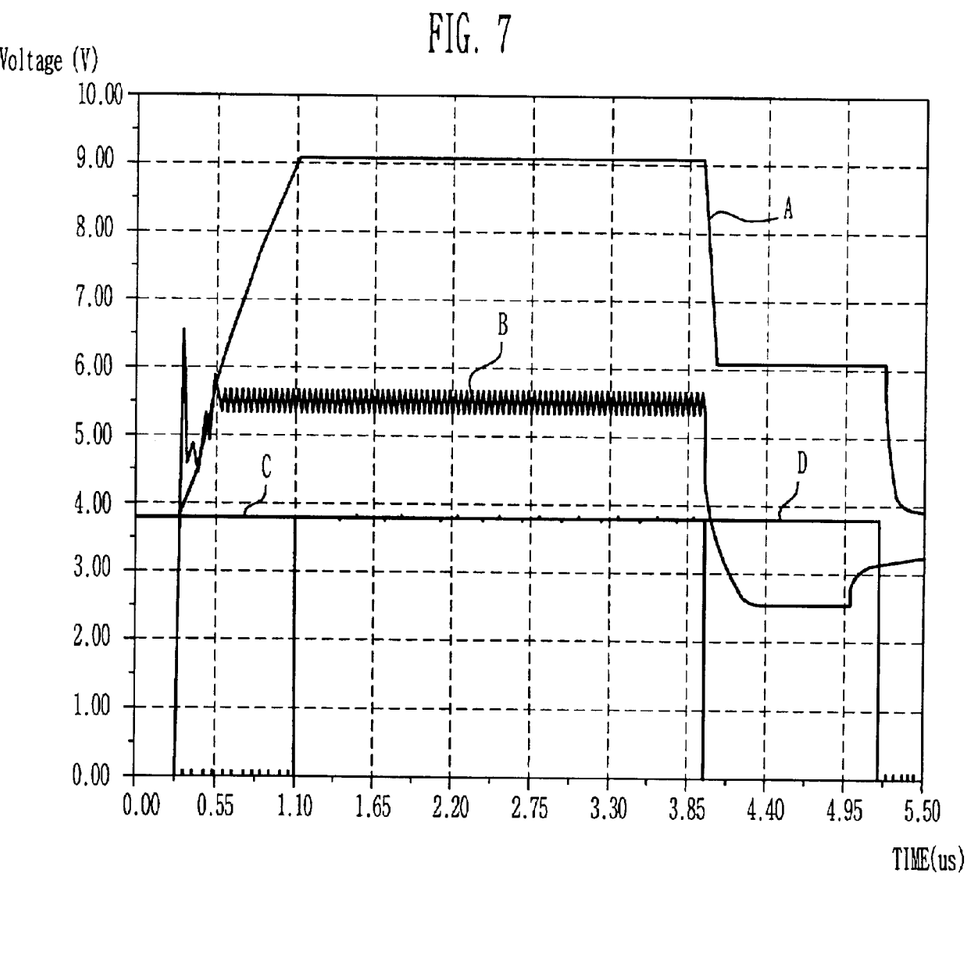
FIG. 7 is a graph illustrating a result of simulating the pumping circuit according to the present invention.

FIG. 7 is a waveform of a simulation result illustrating when the program voltage and the program verify voltage are generated using the pumping circuit according to the present invention. FIG. 7 shows a simulation result at the power supply voltage of 3.7V in the worst case of the simulation conditions for a low-voltage device.

In the graph, 'A' indicates the pumping voltage for the program and program verify operations and 'B' indicates a ripple generating in this case. Also, 'C' indicates a waveform depending on the program signal and 'D' indicates the power supply voltage. In a state where the power supply voltage (D) is applied and the program signal (C) is applied, the program voltage of about 9V is pumped and the program verify voltage of about 6V is then pumped. As can be seen from the drawing, it can be seen that generation of the ripple is significantly reduced compared to the conventional circuit shown in FIG. 2.

As mentioned above, according to the present invention, the program voltage and the program verify voltage of different levels are pumped using the program verify signal. Therefore, the present invention has advantageous effects that it can reduce the ripple, improve the active current and improve the program efficiency.

The present invention has been described with reference to a particular embodiment in connection with a particular application. Those having ordinary skill in the art and access to the teachings of the present invention will recognize additional modifications and applications within the scope thereof.

It is therefore intended by the appended claims to cover any and all such applications, modifications, and embodiments within the scope of the present invention.

What is claimed is:

1. A pumping circuit, comprising:

a first pumping block for pumping an input voltage, said first pumping block being pumped according to only a first clock signal and a second clock signal;

a first latch for latching and outputting a first output of the first pumping block according to a control signal;

a second pumping block for pumping the first output of the first pumping block, said second pumping block being selectively pumped according to a third clock signal and a fourth clock signal generated by logically with a logic combiner combining the control signal with the first clock signal and the second clock signal, respectively;

a second latch for latching and outputting a second output of the second pumping block according to the control signal; and a switching circuit for selectively outputting the outputs of the first and second latches according to the control signal.

2. The pumping circuit as claimed in claim 1, wherein the first pumping block comprises:

a power supply;

a switching element for transferring voltage of the power supply to a first node;

a plurality of diodes which are connected between the first node and the first output of the first pumping block, in series, from each other through a respective connection node; and a plurality of capacitors connected between the respective connection node and a respective clock input terminal, respectively, and charged according to only the first and the second clock signals which are inputted to the respective clock input terminal.

3. The pumping circuit as claimed in claim 1, wherein the second pumping block comprises:

a plurality of diodes which are connected between the first output and the second output, in series, from each other through a respective connection node and use the first output of the first pumping block as input voltage; and a plurality of capacitors connected between the respective connection node and a respective clock input terminal, respectively, and charged according to the third and the fourth clock signals which are inputted to the respective clock input terminal.

4. A pumping circuit, comprising:

a first pumping block including a plurality of diodes which are connected in series from each other through a respective connection node and a first plurality of capacitors connected to the respective connection node between the diodes, respectively, wherein the first plurality of capacitors are charged according to only a first clock signal and a second clock signal having opposite phases and pump an input voltage to generate a program verify voltage;

a first latch for latching and outputting the program verify voltage from the first pumping block according to a program verify signal;

a second pumping block including a plurality of diodes which are connected in series from each other through the respective connection node and a second plurality of capacitors connected to the respective connection node between the diodes, respectively, wherein the second plurality of capacitors are charged according to the first and second clock signals and to a third clock signal and a fourth clock signal having opposite phases that are generated by an inverted signal of the program verify signal and pump the output of the first pumping block to generate a program voltage, said second plurality of capacitors not being charged when said pumping circuit is driven according to said first and second clock signals only;

a second latch for latching and outputting the program voltage from the second pumping block according to the program verify signal; and a switching circuit for selectively outputting the outputs of the first and second latches according to the inverted signal of the program verify signal.

5. A pumping circuit, comprising:

first and second clock generators generating first and second clock signals having opposite phases;

a third clock generator logically combining the first clock signal and an inverted signal of a program verify signal to generate a third clock signal;

a fourth clock generator logically combining the second clock signal and the inverted signal of the program verify signal to generate a fourth clock signal;

a plurality of diodes connected between respective connection nodes between an input node and an output node, for transferring the voltage of a previous node to a next node;

a plurality of capacitors connected between the plurality of the diodes which are connected in series from each other through the respective connection nodes, respectively, and charged according to at least the first and second clock signals to raise the voltage of each of the nodes, only some of said plurality of capacitors being charged when said pumping circuit is driven to only said first and second clock signals and a remainder of said capacitors being charged when said pumping circuit is driven according to the first through fourth clock signals;

a first latch for latching the voltage of a given node, wherein the given node keeps a voltage that is raised to a program verify voltage by said some of said capacitors charged according to only said first and second clock signals;

a second latch for latching the voltage of the output node, wherein said output node keeps a voltage that is raised to a program voltage by all of the capacitors charged according to the first through fourth clock signals; and a switching circuit for selectively outputting the voltages latched in the first and second latches according to an inverted signal of the program verify signal.

6. The pumping circuit as claimed in claim 5, wherein the third clock generator comprises:

a NAND gate logically combining the inverted signal of the program verify signal and the first clock signal; and an inverter inverting the output of the NAND gate.

7. The pumping circuit as claimed in claim 5, wherein the fourth clock generator comprises:

a NAND gate logically combining the inverted signal of the program verify signal and the second clock signal; and an inverter inverting the output of the NAND gate.

8. The pumping circuit as claimed in claim 5, wherein the switching circuit comprises:

a first switching means for outputting the program verify voltage or a ground voltage according to the program verify signal and the inverted signal of the program verify signal;

a second switching means for outputting the program voltage to an output terminal according to the inverted signal of the program verify signal and the output of the first switching means.

9. A method of driving a pumping circuit comprising the steps of:

generating first and second clock signals having opposite phases;

logically combining the first clock signal and an inverted signal of a program verify signal to generate a third clock signal;

logically combining the second clock signal and the inverted signal of the program verify signal to generate a fourth clock signal;

inputting, of said clock signals, only said first clock signal and said second clock signal to a first pumping block, said first pumping block including a first plurality of diodes which are connected in series from each other through respective connection nodes, and a first plurality of capacitors respectively connected between said first plurality of diodes through said respective connection nodes;

charging said first plurality of capacitors according to, of said clock signals, only said first and second clock signals, and pumping an input voltage to generate a program verify voltage;

latching and outputting the program verify voltage from the first pumping block according to the program verify signal;

inputting said first, second, third and fourth clock signals to a second pumping block, said second pumping block including a second plurality of diodes which are connected in series from each other through respective connection nodes, and a second plurality of capacitors respectively connected between said second plurality of diodes through said respective connection nodes;

charging said second plurality of capacitors according to said first, second, third and fourth clock signals, and pumping the output of the first pumping block to generate a program voltage, said second plurality of capacitors not being charged when said pump circuit is driven according to only said first and second clock signals;

latching and outputting the program verify voltage from the second pumping block according to the program verify signal; and selectively outputting the voltages latched and output from the first and second pumping blocks, respectively, according to the inverted signal of the program verify signal.

10. The method as claimed in claim 9, wherein the step of selectively outputting includes outputting the program verify voltage or a ground voltage as a switched output according to the program verify signal and the inverted signal of the program verify signal.

11. The method as claimed in claim 10, further comprising outputting the program voltage to an output terminal according to the inverted signal of the program verify signal and said switched output.

* * * * *